United States Patent [19]

Kita et al.

[11] 4,049,098

[45] Sept. 20, 1977

[54] HYDRAULIC MOTOR WITH A MECHANICAL BRAKE DEVICE

[75] Inventors: Yasuo Kita; Makoto Kou, both of Kyoto, Japan

[73] Assignee: Shimadzu Seisakusho Ltd., Kyoto, Japan

[21] Appl. No.: 708,550

[22] Filed: July 26, 1976

[30] Foreign Application Priority Data

Aug. 23, 1975 Japan .................................. 50-102498

[51] Int. Cl.² .......................................... F16D 67/00
[52] U.S. Cl. ................................ 192/8 R; 64/DIG. 2
[58] Field of Search ........................................ 192/8 R

[56] References Cited

U.S. PATENT DOCUMENTS

| | | | |
|---|---|---|---|
| 2,925,157 | 2/1960 | Davis | 192/8 R |
| 2,997,146 | 8/1961 | Chiolerio | 192/8 R |
| 3,536,169 | 10/1970 | Arnold | 192/8 R |
| 3,621,958 | 11/1971 | Klemm | 192/8 R |
| 3,627,087 | 12/1971 | Eskridge | 192/8 R |
| 3,656,320 | 4/1972 | Belansky | 192/8 R X |

Primary Examiner—Benjamin W. Wyche
Attorney, Agent, or Firm—George B. Oujevolk

[57] ABSTRACT

This invention provides a hydraulic motor with a mechanical brake device in which a brake means is always pressed in position between the case body of the brake device and the brake operating member by the pressing force of plural spring members, and the brake operating member pressing the brake means is slid in the axial direction resisting against the spring members through cam means in response to a driving torque from a drive shaft of a hydraulic motor assembly so that the brake device always can be restrained from rotation of a free rotatable drive shaft during the non-operation of the hydraulic motor assembly and capable to be taken off restraint in response to a driving torque from the drive shaft of a hydraulic motor assembly.

6 Claims, 5 Drawing Figures

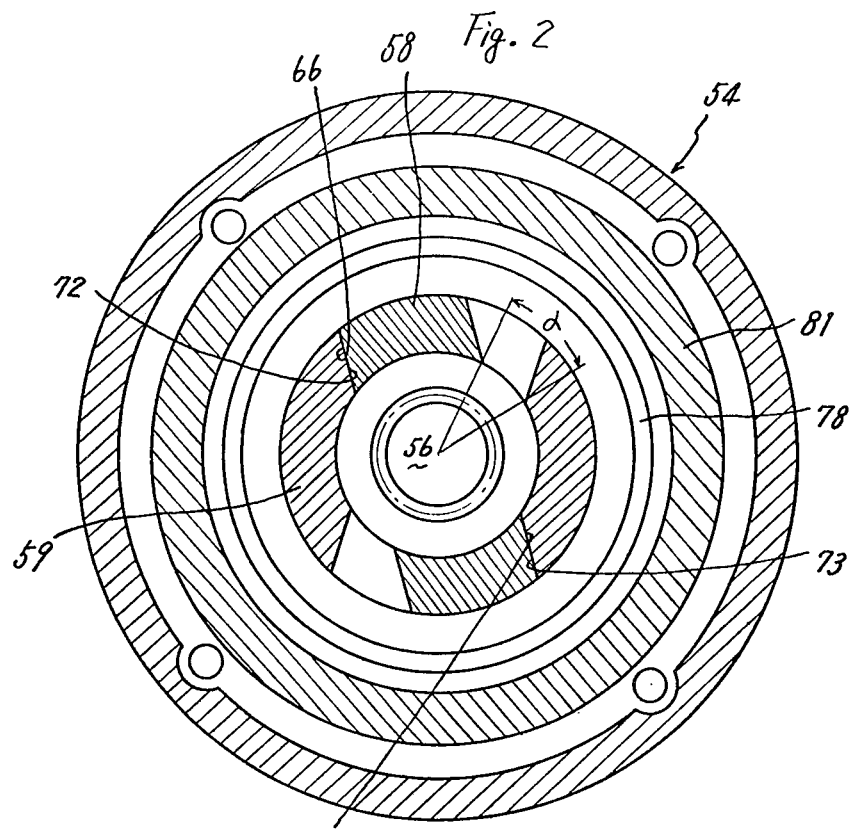
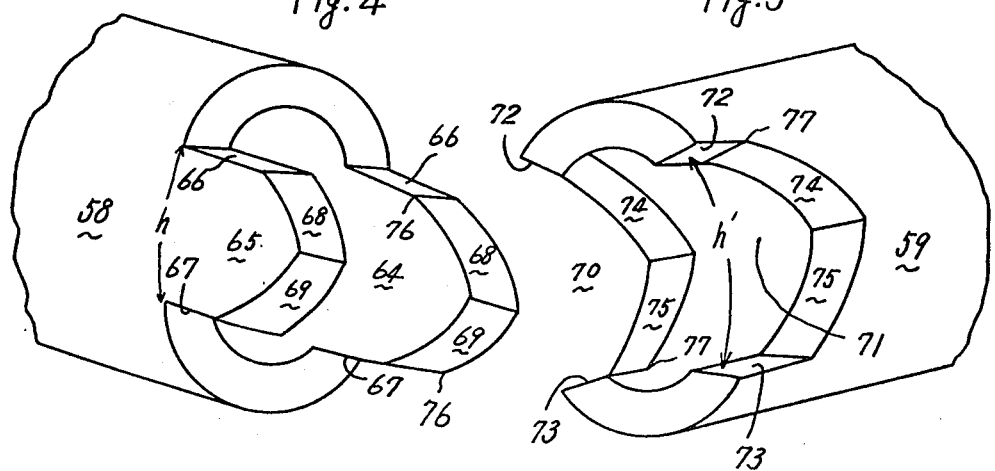

HYDRAULIC MOTOR WITH A MECHANICAL BRAKE DEVICE

BACKGROUND OF THE INVENTION

The present invention relates to a hydraulic motor, and more particularly to a hydraulic motor equipped with a brake device which can be removed in response to the driving torque from the drive shaft of a hydraulic motor assembly.

BRIEF DESCRIPTION OF THE PRIOR ART

Generally speaking, when it is required to restrain the rotation of the drive shaft of a hydraulic motor, it is impossible to instantly restrain the rotation of the drive shaft only by stopping the feeding of pressure liquid to the hydraulic motor, therefore, most hydraulic motors are equipped with a brake device. This is especially so for hydraulic motors incorporated in material handling machines such as the hydraulic motor for driving the hoisting drum of a winch where the brake device is essential.

For the foregoing purpose, however, most of the brake devices equipped with hydraulic motors have been a fluid-pressured brake device. For example, there is provided a brake plate suitable in the axis direction on the drive shaft, which is put on the brake in such a way as to press it on the brake shoe facing it, with a spring, and on the other hand it is taken off the brake in such a way as to slide in the axial direction with the drive shaft so as to separate it from the brake shoe against the pressing force of the applied spring in response to the actuation of the hydraulic cylinder whose piston rod is linked with a brake plate, therefore, such a type of brake device has to be equipped with a hydraulic cylinder. Besides, high pressure is required in order to make it slide against the pressing force of the spring, which requires the piston and cylinder to be made of those materials resisting a high pressure as applied with the spring and also which requires them to be equipped with such a thickness of wall as being able to stand against the pressing force on the spring. Thus, it is necessary that the fluid-pressured brake device to be manufactured is of a large size and of fairly heavy weight, resulting in being costly. Besides, the mechanism has often had trouble in that the brake device will not be applied properly due to leakage of the pressure fluid out of the cylinder during the operation of the hydraulic motor.

OBJECTS OF THE INVENTION

Accordingly, it is a primary object of the invention to provide a hydraulic motor equipped with some mechanical brake device which requires no hydraulic cylinders.

Another object of the invention is to provide a hydraulic motor equipped with a brake device which functions so as to take off the brake automatically in response to the driving torque from the drive shaft of the hydraulic motor assembly.

SUMMARY OF THE INVENTION

The hydraulic motor with the brake device relating to the invention is coupled not only to the primary drive shaft of the hydraulic motor assembly but also with the secondary drive shaft aligned on the same axis with the primary drive shaft, which is coupled therewith by a shaft coupling assembly that has a pair of coupling element members, one of which is mounted slidably in the axial direction with either of the two drive shafts and the other of which is fixed to the other of the two drive shafts, where a pair of coupling element members have cam means for sliding a slidable coupling element member in the axial direction in response to the driving torque from the hydraulic motor assembly through the primary drive shaft so as to keep the coupling relation between the primary drive shaft and the secondary drive shaft.

The slidable coupling element member has a holder on its circumference on which the brake means consisting of the brake plates and the brake shoes, besides the brake operating member have a face in contact with the brake means and is mounted with the slidable coupling element member through an angular contact bearing, where the brake operating member presses the brake means against the case body of the brake device by the pressing force of the spring.

In the aforementioned mechanism, therefore, the slidable coupling element member is restrained of its rotation between the case body and the brake operating member, by braking the shaft coupling assembly (the primary drive shaft and the secondary drive shaft). On the other hand, generation of a driving torque from the primary drive shaft by actuation of the hydraulic motor assembly will make the slidable coupling element member slide together with the brake operating member in response to the driving torque generated against the pressing force of the resisting spring, resulting in taking off the brake means pressed between the brake operating member and the case body, so that the driving torque from the primary drive shaft is transferred to the secondary drive shaft through the shaft coupling assembly, which will rotate the secondary drive shaft. Thus, the braked action is removed.

Therefore, the hydraulic motor with the brake device of this invention is so arranged that the braking action can be taken off automatically in response to the driving torque from the primary drive shaft of the hydraulic motor assembly mechanically without providing any separate power sources such as a hydraulic cylinder, etc., and on the other hand the braking action released can be put on automatically in response to deenergization of the driving torque, i.e., stopping of the hydraulic motor assembly.

As the brake device of the hydraulic motor, the brake device of this invention is designed of intrinsical mechanical structure and will not have such troubles as leakage of pressure fluid out of the hydraulic cylinder as often seen in the fluid-pressured brake.

Besides, in the mechanism of the hydraulic motor with the brake device of this invention, the structure of the brake device can be manufactured compact, and so it is possible to make it up with approximately the same configuration size and weight as those of conventional hydraulic motors with a brake device.

Other features and advantages of the invention will become apparent from the following detailed description of the preferred embodiments of the invention with reference to the accompanying drawings, in which:

BRIEF DESCRIPTION OF THE DRAWINGS

FIG. 2 is a vertical section taken on line II—II of FIG. 1;

FIG. 4 is a perspective illustration of one unit of the pair of coupling element members forming a shaft coupling assembly for connecting two drive shafts; and FIG. 5 is a similar view showing the other coupling member of the pair.

DESCRIPTION OF THE PREFERRED EMBODIMENT

Figure 1:
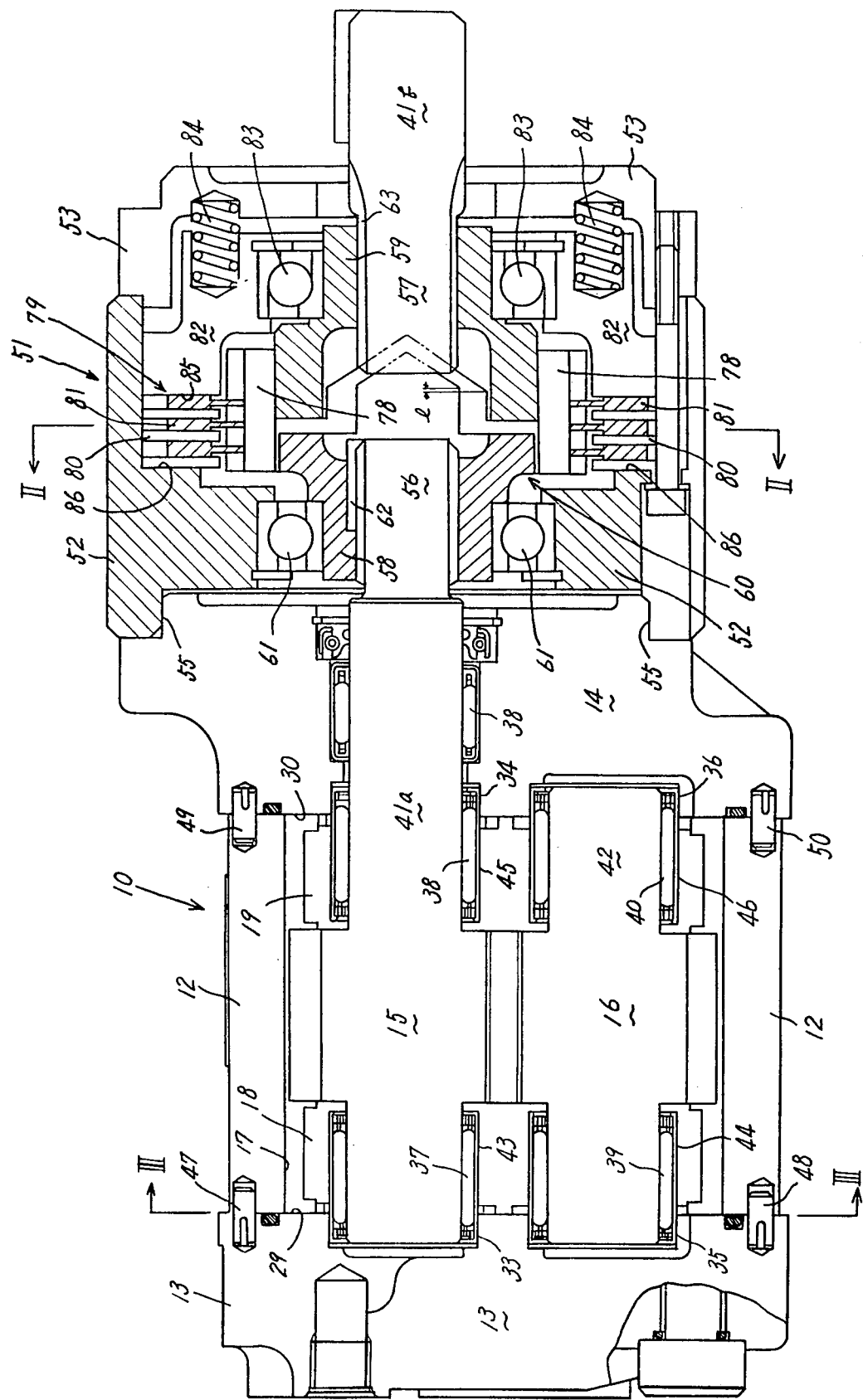
FIG. 1 is a longitudinal sectional view taken on line I—I of FIG. 3, of a hydraulic motor with the brake device showing an embodiment of the invention.
Figure 3:
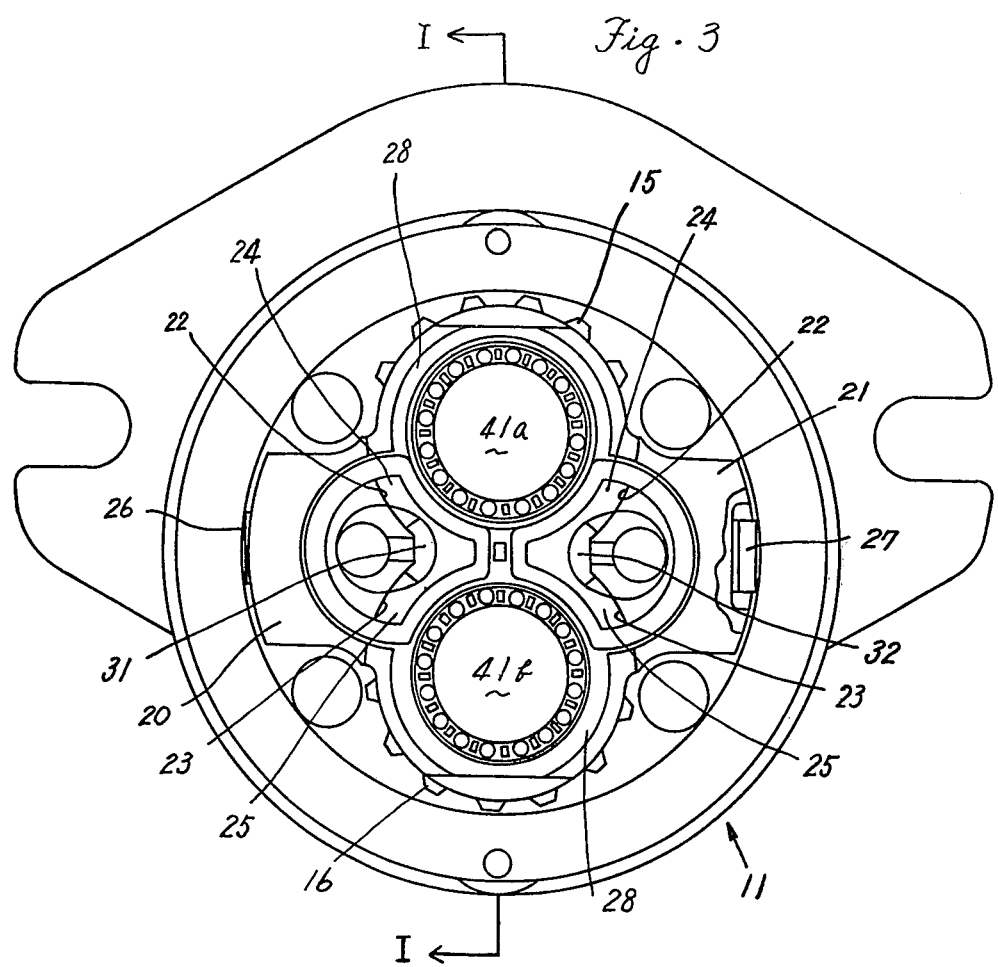
FIG. 3 is a vertical section on line III—III of FIG. 1.

Referring to the drawings, the structure of the hydraulic motor assembly 10 is similar to those of conventional ones already known well. The structure of the hydraulic motor assembly 10 shown in FIG. 1 is the same as that of the hydraulic motor disclosed in U.S. Pat. No. 3,309,997, that is, the casing 11 consists of a cylindrical wall body 12 and end closures 13 and 14 thereof. A pair of intermeshing gears 15 and 16 are located within said casing 11 in such a manner that the peripheries of the gears 15 and 16 are spaced from the inner wall 17 of the cylindrical body 12 of the casing 11. For gear end face sealing, a pair of thrust plates 18 and 19 are located on the opposite sides of the meshing gears 15 and 16. Gear periphery sealing means 20 and 21 may comprise a member having arcually concave sealing surfaces 22 and 23 corresponding to the addendum circles of the gears 15 and 16. Each of the thrust plates 18 and 19 has peripheral portions 24 and 25 for receiving the gear periphery sealing members 20 and 21 so that the gear periphery sealing members 20 and 21 may be supported by bridging it between the two thrust plates 18 and 19. The peripheral portions 24 and 25 are so shaped as to receive the sealing surfaces 22 and 23 of the sealing members 20 and 21 in sealing engagement. The sealing members 20 and 21 may be urged by spring means 26 and 27 toward the thrust plates 18 and 19 for sealing engagement therewith.

The cylindrical body 12 of the casing 11 may be secured to end closures 13 and 14 by clamping it between the enclosures by a plurality of at least three, and preferably four bolts, 47, 48, 49 and 50 extending to the other end closure. The cylindrical body 12 may be fixed in a definite position by inscribing these bolts 47, 48, 49 and 50 with the inside wall of the cylindrical body 12.

Each of the thrust plates 18 and 19 has at their opposite ends depressed areas 28 spaced from the end walls 29 and 30 of the end closures 13 and 14 and from the end faces of the gears 15 and 16 to receive the fluid pressure thereat in such a manner that each of the thrust plates 18 and 19 is balanced in the axial direction.

The thrust plates 18 and 19 and gear sealing members 20 and 21 may coact to form substantially axially directed inlet and outlet passages 31 and 32 for the fluid to be introduced into the tooth spaces at the inlet side and to be discharged from the tooth spaces at the outlet side.

Each of the two shafts 41a and 42 for the two gears 15 and 16 may be supported at its opposite ends through bearings 37, 39 and 38, 40 by bores 33, 35 and 34, 36 recessed in the end closures 13 and 14 of the casing 11. Each of the thrust plates 18 and 19 has a pair of bores 43, 44 and 45, 46 which cooperate with the bores 33, 35 and 34, 36 in the end closures 13 and 14 to support two gears shafts 41a and 42. The driven shaft 42 may be supported only by the thrust plates 18 and 19. In this case, the swing movement about the drive shaft 41a of the unit including the driven shaft 42, the driven gear 16 and the thrust plates 18 and 19 may be prevented by inscribing the gear periphery sealing members 20 and 21 with the inside wall 17 of the cylindrical body 12 of the casing 11.

The brake device 51 has the casing 54 consisting of the cylindrical case body 52 and its end closure 53, which brake device 51 is attached to the hydraulic motor assembly 10 with the socket combination 55 of said case body 52 of said casing 54 with the end closure of the casing 11.

The brake device 51 is connected not only with the primary drive shaft 41a of the hydraulic motor assembly 10 with one part 56 projecting into the inside of the casing 54 but also with the secondary drive shaft 41b with one part 57 projecting into the inside of said casing 54 from the end closure 53 of said casing 54, which is aligned on the same axis with said drive shaft 41a. The primary drive shaft 41a is coupled with the secondary drive shaft 41b by the shaft coupling assembly 60 consisting of a pair of cylindrical coupling element members 58 and 59, wherein the coupling element member 58 is fixed to the one end part 56 of said primary drive shaft 41a with the key 62 and is born with the bearing 61 between the case body 52 and said one end part 56 of said primary drive shaft 41a and on the other hand the coupling element member 59 is mounted in the rear end 57 of the secondary drive shaft 41b slidably in axis direction of said drive shaft 41b with the spline 63, on the face with which the coupling element member 58 is confronting with the coupling element member 58, there are provided the cam means which functions to make the slidable coupling element member 59 slide in axis direction of the shaft in response to the driving torque from said primary drive shaft 41a, keeping the coupling relation between said primary drive shaft 41a and said secondary shaft 41b.

The structure of the pair of coupling element members 58 and 59 is described referring to FIGS. 4 and 5.

In the drawings, there are provided a pair of protruded parts 64 and 65 having a little sharper angle h than the angle h' of the notched parts 70 and 71 on the one end part of the coupling element member 58 so that said protruded parts 64 and 65 can be fitted into said notched parts 70 and 71 which said protruded parts 64 and 65 consist of a pair of side faces 66 and 67 extending in parallel to the direction of the shaft and a pair of end faces 68 and 69 curved extending to the direction of the shaft, and also said notched parts 70 and 71 provided on the one end parts of the coupling element member 59 consists of a pair of side faces 72 and 73 and a pair of curved end faces 74 and 75, which are so formed as to be engaged fittedly with the corresponding side faces 66 and 67 and end faces 68 and 69 of the coupling element 58. Thus, as to the pair of coupling element members 58 and 59, the rotation of coupling element member 58 is to be transferred to the coupling element member 59 through the side faces 66, 72 and 67, 73 engaged respectively with the difference a between the angle h of protruded parts 64 and 65 and the other angle h' of notched parts 70 and 71, in the mechanism, said coupling element member 58 is also engaged with said coupling element member 59 through the end faces 68 and 69 of said protruded parts 64 and 65 and the end faces 74 and 75 of said notched parts 70 and 71, where said slidable coupling element member 59 is to be made slidable in the axis direction getting away from said other coupling element 58 along the spline 63 by driving of only said other coupling element member 58 which is rotating with the difference of angle a by the cam means. In this case, the sliding distance $l$ is determined by the amount of gap *l* produced in the axis direction of shaft between the outer edge 76 of the end faces 68 and 69 of the protruded parts 64 and 65 and the outer edge 77 of the end faces 74 and 75 of the notched parts 70 and 71 (Refer to FIG. 1).

In the slidable coupling element member 59, one of the pair of coupling element members 58 and 59, there is the cylinder holder 78 mounted and fixed thereon, on the circumference of the holder 78, there are provided brake means 79 which consist of plural annular brake plates 80 and the plural brake shoes 81 sandwiched between each of the annular brake plates 80 and held by the holder 78. Besides, the cylindrical brake operating member 82 having the face 85 in contact with the brake means 79 is fixed on the circumference of the slidable coupling element member 59 through the angular contact bearing 83.

Thus, the brake operating member 82 is so arranged as to be able to slide together with the coupling element member 59 in the axis direction of shaft though it does not rotate together with the coupling element member 59. The brake operating member 82 always is pressing the brake means 79, positioning between the contacting face 85 and the inner wall 86 of the case body 52 by the pressing force of the plural springs 84 positioned between it and the end closure 53 of the casing 54.

The pressing force of the springs 84 also is always making the slidable coupling element member 59 slide in the axial direction for the fixed coupling element member 58, therefore, the brake means 79 always is being pressed between the contacting face 85 of the brake operating member 82 and the inner wall 86 of the case body 52, it results in always putting on the brake on the pair of coupling element members 58 and 59, in other words, the rotation of the drive shafts 41a and 41b is to be curbed by the brake device 51.

The action of the brake device 51 is to be taken off in response to actuation of the hydraulic motor assembly 10. Actuation of the hydraulic motor assembly 10 generates a driving torque from the primary drive shaft 41a, thereby said drive shaft 41a rotates by the angle *a* (See FIG. 2) together with the coupling element member 58, and at the same time, the coupling element member 59 slides on the secondary drive shaft 41b in the axis direction for getting away from said coupling element member 58 by the cam mechanism formed with the engagement of both the end faces 68 and 69 of the protruded parts 64 and 65 formed in the coupling element member 58 with both the end faces 74 and 75 of the notched parts 70 and 71 formed in said coupling element member 59, and the brake operating member 82 also slides together with said coupling element member 59 resisting against the force of the springs 84. Thus, the brake means 79 having been pressed up to that time between the contacting face 85 of the brake operating member 82 and the inner wall 86 of the case body 52 are to be released out of the pressed condition in response to the sliding of said brake operating member 82, resulting in preparing the brake shoes 81 of the brake means 79 to be ready to rotate with the holder 78 together with the coupling element member 59, in other words, in this step the brake device 51 has been taken off, where rotation of the primary drive shaft 41a is transferred to the secondary drive shaft 41b through the shaft coupling assembly 60. Thus, the rotation of the secondary drive shaft 41b can be used extensively for many fields of use.

We claim:

1. In a hydraulic motor having a primary drive shaft (41a), a brake device capable of being removed in response to the driving torque from said primary drive shaft, the brake device comprising:
   a. a secondary drive shaft (41b) aligned on the same axis with said primary drive shaft;
   b. a shaft coupling assembly (60) for connecting said secondary drive shaft to said primary drive shaft, said coupling assembly including a pair of coupling element members (58, 59) one of which is fixed to the either of said two drive shafts and other of which is slidably mounted in the axial direction with the other of said two drive shafts;
   c. a brake means (79) held on said slidable coupling element member, said brake means including the plurality of circular brake shoes (81) and circular brake plate members (80);
   d. a cylindrical brake operating member (82) with a bearing (83) mounted on said slidable coupling element member and slidable therewith;
   e. a case (52) for holding said brake device, a plurality of spring members (84) for pressing said brake means (79) against the case (52) of said brake device through said brake operating member (82); and,
   f. a cam means for sliding said slidable coupling element member together with said brake operating member (82) in the axial direction resisting against said spring members (84) in response to the driving torque from said primary drive shaft.

2. A hydraulic motor with the brake device as defined in claim 1, in which said cam means is formed by the engagement of curved end faces of protruding parts formed in said slidable coupling element member with corresponding curved end faces of notched parts formed in said fixed coupling element member.

3. A hydraulic motor with the brake device as defined in claim 2, in which said protruding parts are formed with a little sharper angle than the angle of said notched parts.

4. In a drive device having a primary drive shaft (41a), a brake device capable of being removed in response to the driving torque from said primary drive shaft, the brake device comprising:
   a. a secondary drive shaft (41b) aligned on the same axis with said primary drive shaft;
   b. a shaft coupling assembly (60) for connecting said secondary drive shaft to said primary drive shaft, said coupling assembly including a pair of coupling element members (58, 59), one of which is fixed to the either of said two drive shafts and other of which is slidably mounted in the axial direction with the other of said two drive shafts;
   c. a brake means (79) held on said slidable coupling element member, said brake means including the plurality of circular brake shoes (81) and circular brake plate members (80);
   d. a cylindrical brake operating member (82) with a bearing (83) mounted on said slidable coupling element member and slidable therewith;
   e. a case (52) for holding said brake device, a plurality of spring members (84) for pressing said brake means (79) against the case (52) of said brake device through said brake operating member (82); and,
   f. a cam means for sliding said slidable coupling element member together with said brake operating member (82) in the axial direction resisting against said spring members (84) in response to the driving torque from said primary drive shaft.

5. A drive device with the brake device as defined in claim 4, in which said cam means is formed by the engagement of curved end faces of protruding parts formed in said slidable coupling element member with corresponding curved end faces of notched parts formed in said fixed coupling element member.

6. A drive device with the brake device as defined in claim 5, in which said protruding parts are formed with a little sharper angle than the angle of said notched parts.

* * * * *